Figure 1:
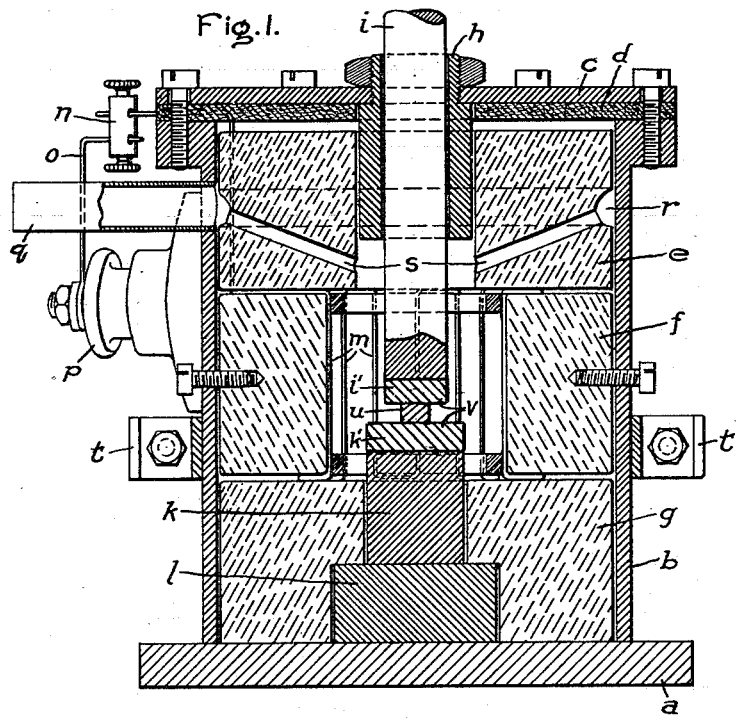

Feb. 11, 1930.  M. PIRANI  1,747,133

METHOD FOR THE MANUFACTURE OF BODIES OF GREAT DENSITY

Filed May 11, 1928

Inventor:
Marcello. Pirani,
by Charles E. Mullar
His Attorney.

Patented Feb. 11, 1930

1,747,133

UNITED STATES PATENT OFFICE

MARCELLO PIRANI, OF BERLIN-WILMERSDORF, GERMANY, ASSIGNOR TO GENERAL ELECTRIC COMPANY, A CORPORATION OF NEW YORK

METHOD FOR THE MANUFACTURE OF BODIES OF GREAT DENSITY

Application filed May 11, 1928, Serial No. 277,042, and in Germany June 29, 1927.

The present invention comprises a new way of producing from crystalline powders, difficultly workable or non-workable bodies which have a density approaching that of bodies of the same material which are solidified from a molten condition.

In the manufacture of difficultly workable or non-workable solid bodies, it is customary to employ a powder-like initial material which is first greatly pressed and then heated close to the point of fusion for the purpose of a dense sintering. It has already been proposed to simultaneously effect the pressing and the sintering. These proposals have not however obtained any practical importance in connection with bodies, which in their production must be heated to over 1000° as there exists no pressing form which in addition to the high heat can also stand pressures of over 1000 kg. per square centimeter which are required for the formation of sufficiently dense bodies.

According to the present invention the powder-like material is first pressed and then subjected to such a heating that a coherent body is obtained of a certain inherent strength although having great porosity. This porous sintered body is then highly heated and directly thereupon or also simultaneously subjected to a very high pressure between pressure cheeks having no lateral limitations. The heating temperature of the porous body lies above red glow, but considerably below that temperature at which a pressed body obtains at least 85% of the density obtainable by fusion. As a rule the heating temperature used on the porous body will not be more than 70% of the absolute temperature which is necessary in order to render pressed bodies dense or approximately dense by merely sintering. The pressures immediately following the heating or used simultaneously with the same are however essentially higher than those pressures which are used as a rule in the pressing of powder-like initial material.

In the new process the density of the bodies to be produced depends mainly on the high pressure used in the second manufacturing stage. In both manufacturing stages far less heat is employed than is usually customary since the bodies to be produced are not heated close to their melting point. It is possible therefore in most cases and especially in the manufacture of bodies of difficulty fusible metal or metal combinations to save greatly in the cost of current. A far more essential advantage of the new process thus lies in the fact that solid bodies of such initial materials, as for example, coarse grained tungsten powder and zirconium oxide powder can be produced which hitherto with the usual pressing and subsequent high sintering lead only to insufficiently dense or even entirely porous bodies. The manufacture thus becomes far more independent of the size of the grains and constituency of the initial material, and only needs in order to manufacture dense bodies from the most widely different materials to adapt the pressure and the temperature in the second manufacturing stage to the powder unit of the initial material. This greater freedom in the choice of the initial material also gives together with the high pressures used, the possibility of influencing the recrystallization of the body to be manufactured.

In order to favorably influence the crystallization of the body to be produced, the powder-like initial material can also in the known manner have added thereto suitable additions with tungsten, for example, alkali silicates. As in the new process the heating temperatures are far lower than in the hitherto customary manufacturing processes, there cannot naturally take place a premature vaporization of the additions which mostly have a lower point of fusion than the basic body. It thus becomes possible thereby to use such additions influencing the crystallization which hitherto have been useless on account of their low vaporizing temperature.

Finally, the bodies produced in accordance with the invention can be subjected subsequently to a temperature, for the purpose of equalizing the interior stresses produced by the pressures, with a simultaneous development of a recrystallization.

Figure 2:
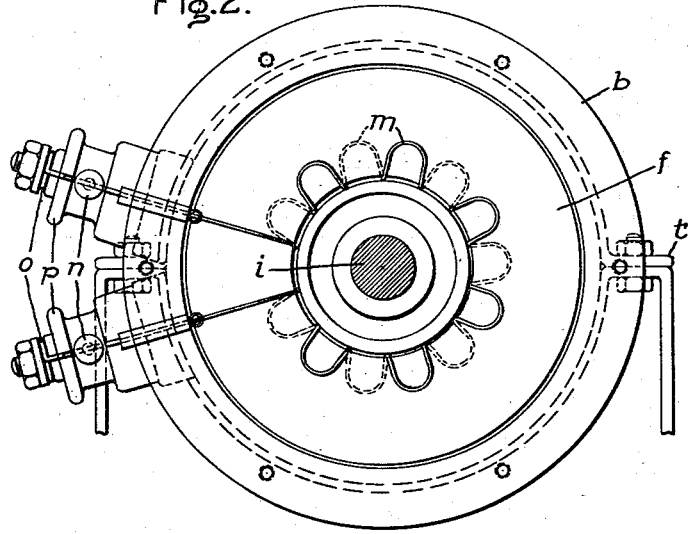

The novel features which I believe to be characteristic of the invention are set forth with particularity in the appended claims. The invention itself, however, will best be understood from reference to the following specification when considered in connection with the accompanying drawing in which Fig. 1 is a cross section through a press employed in carrying my invention into effect, while Fig. 2 is a plan view thereof.

In carrying the invention into effect, I take tungsten powder having a volume of about 1.5 cc. for 10 grams of a mean grain size of 3 to 8 mu (with extreme grain sizes of 0.5 to 16 mu). The pressing is carried out by applying a pressure of about 1000 kilograms per square centimeter and at a sintering temperature not over 2400° C. The sintered body produced is highly porous and has a density of about 14 which may be compared with solid tungsten having a density of 19. After sintering, the body is subjected without without lateral limitations, to pressure in a reducing or indifferent gas atmosphere and to a temperature of about 1300° C., the pressure employed being about 15,000 kilograms per square centimeter. As a result of the pressure applied the density of the body rises to 17 or 18.

Pure calcium fluoride having a fusion point of 1370° C. may be compressed at a pressure of about 800 kilograms per square centimeter into bodies and these may be sintered at a temperature of about 900° C. The sintered bodies are then compressed at 1000° C. and at a pressure of about 1500 kilograms per square centimeter whereby the original porous and brittle body which was easily workable by scraping or filing becomes a very dense, marble-like mass which can be broken only by being worked with a hammer.

Referring more particularly to the drawing, I have indicated at $a$ a ground plate on which is set a furnace casing $b$ provided with a cover $c$. An asbestos ring $d$ is interposed between the cover and casing. The furnace lining is formed by three superposed annular bodies $e, f, g$ of a refractory material, for example, zirconium oxide. Centrally in the cover $c$ there is set a guide tube $h$ for a cylindrical or prismatic plunger $i$ of tungsten provided with a welded-on pressure cheek $i'$ which consists preferably of a hard metal alloy which, like the product described in German Patent No. 420,689, contains more than 50% of tungsten carbide. The plunger base is formed by two tungsten blocks $k, l$ set tightly into the furnace lining $g$, the upper one $k$ being similar to the plunger $i$ and having a welded-on pressure cheek $k'$ of a hard metal alloy. The pressure cheeks $i', k'$ of the plunger and of the base are surrounded by a heating wire winding $m$ supported on the furnace lining blocks, the ends of the winding being connected to terminals $n$ on the outside of casing $d$. The latter are connected by short lines $o$ with insulated, fixed terminals $p$ to which the feeder lines are connected.

A tube $q$, serving for the introduction of a reducing or indifferent gas, leads into an annular duct $r$ in the upper lining block $e$ and is connected by a number of inclined passageways $s$ with the interior of the furnace. The gas introduced into the furnace may escape through a slot located in the plunger and guiding tube $h$. A support $t$ provided with handles permits the casing $b$ together with cover $c$, blocks $e, f$, tube $h$ and heating wire $m$ to be raised from the base plate $a$, block $g$ and the plunger bases $k, l$, after the plunger has been removed. In this manner the porous, sintered block $u$ may be placed on the pressure cheek $k'$ of the base $k$. The sintered body $u$ is then rendered dense by the application of pressure through the plunger $i$.

The material $u$ as may be clearly seen from the drawing, is not limited laterally and can thus extend if necessary in that direction without any danger. In order that the sintered body $u$ may not become welded to the pressure cheeks when brought to a red heat by the action of the heating wire and also during the pressure between the pressure cheeks of the plunger and the base, the surfaces of the pressure cheeks $i'$ $k'$ are covered with suitable protective covers, for example, with carbonized paper layers $v$.

The pressure device permits the formation of solid, tablet-shaped, sintered bodies, and if desired small metal plates. When the pressure arrangement has suitable dimensions, I can also produce rod-shaped bodies, blocks, plates and large metal sheets. The pressure arrangement can obviously be made in different forms if desired, for example, the form of the heating wire winding and of the furnace lining may be modified. Furthermore, instead of a single plunger acting against a fixed base I can employ two movable plungers movable toward each other.

What I claim as new and desire to secure by Letters Patent of the United States, is:

1. The method of making solid bodies of great density from powdered materials, which comprises pressing and sintering the powdered material, and thereafter heating the sintered body to an elevated temperature and subjecting it while hot to a pressure materially greater than said first mentioned pressure.

2. The method of making solid bodies of great density from powdered materials, which comprises pressing and sintering the powdered material, and thereafter heating the sintered body to an elevated temperature and subjecting it to pressure between pressure cheeks, said material being without lateral support during the pressing operation.

3. The method of making solid bodies of great density from powdered materials, which comprises pressing and sintering the powdered material, heating the sintered body to an elevated temperature and subjecting it to pressure between pressure cheeks, said material being without lateral support during the pressing operation, and thereafter tempering the body.

4. The method of making solid bodies of great density from powdered materials, which comprises pressing and sintering the powdered material, heating the sintered body to an elevated temperature and subjecting it to pressure between pressure cheeks, said material being without lateral support during the pressing operation, the temperature employed during said heating being above red heat but below a temperature at which the pressed body would have a density equal to about 85% of the density which would be obtained by fusion.

In witness whereof, I have hereunto set my hand this 25th day of April, 1928.

MARCELLO PIRANI.